(12) United States Patent
Harris et al.

(10) Patent No.: US 7,748,661 B2
(45) Date of Patent: Jul. 6, 2010

(54) AIRCRAFT STRUCTURE AND A FASTENER FOR USE THEREWITH

(75) Inventors: Andrew James Harris, Bristol (GB); David Mark Stewart, Belfast (GB)

(73) Assignee: Airbus UK Limited, Bristol (GB)

( * ) Notice: Subject to any disclaimer, the term of this patent is extended or adjusted under 35 U.S.C. 154(b) by 529 days.

(21) Appl. No.: 11/613,807

(22) Filed: Dec. 20, 2006

(65) Prior Publication Data

US 2007/0164161 A1    Jul. 19, 2007

(30) Foreign Application Priority Data

Dec. 21, 2005    (GB) ................. 0526084.9

(51) Int. Cl.
*B64C 1/12*    (2006.01)
(52) U.S. Cl. .............. 244/131; 244/132; 244/137.4
(58) Field of Classification Search .......... 244/131, 244/132, 137.4, 127; 294/82.26; 411/383, 411/338, 178, 173, 119, 120
See application file for complete search history.

(56) References Cited

U.S. PATENT DOCUMENTS

| 2,951,664 | A | * | 9/1960 | Smith .................. 244/135 R |
| 4,295,765 | A | | 10/1981 | Burke |
| 4,364,533 | A | | 12/1982 | Pompei et al. |
| 4,456,206 | A | | 6/1984 | Tijssen |
| 4,869,632 | A | * | 9/1989 | Radtke .................. 411/55 |
| 5,961,266 | A | | 10/1999 | Tseng |
| 6,116,832 | A | * | 9/2000 | Wolf et al. .............. 411/383 |
| 6,261,039 | B1 | | 7/2001 | Reed |
| 6,684,593 | B2 | * | 2/2004 | Brenneis et al. .......... 52/630 |
| 6,889,939 | B2 | * | 5/2005 | Rouyre et al. ............ 244/131 |
| 7,316,533 | B2 | * | 1/2008 | Tanimura ................. 411/119 |
| 2002/0110437 | A1 | * | 8/2002 | Kirimoto ................. 411/119 |
| 2002/0114681 | A1 | | 8/2002 | Tseng |
| 2002/0119027 | A1 | * | 8/2002 | Nago .................... 411/119 |
| 2002/0154966 | A1 | | 10/2002 | Stone et al. |
| 2005/0207866 | A1 | | 9/2005 | Attanasio |

FOREIGN PATENT DOCUMENTS

| EP | 0 272 020 A1 | 6/1988 |
| EP | 0 780 581 A1 | 6/1997 |
| GB | 601236 | 4/1948 |
| GB | 810394 | 3/1959 |
| GB | 841320 | 7/1960 |
| GB | 1513233 | 6/1978 |
| GB | 2002866 A | 2/1979 |
| JP | 11-107385 A | 4/1999 |

OTHER PUBLICATIONS

UK Search Report on GB 0526084.9 dated Apr. 12, 2006.
UK Search Report on GB 0526084.9 dated Nov. 1, 2006.

* cited by examiner

*Primary Examiner*—Timothy D Collins
*Assistant Examiner*—Michael Kreiner
(74) *Attorney, Agent, or Firm*—Lowe Hauptman Ham & Berner, LLP

(57) ABSTRACT

An aircraft structure, for example a wing (20), includes a structural skeleton having structural elements (for example, spars (60) and ribs (70)) enclosed within a skin (200). A fastener (110a,b) is fastened to the skeleton and wholly within the skin (200). The fastener (110a,b) fastens to the structure (20) a bracket (120) for carrying stores (80). The fastener (110a,b) includes a body (300) defining an internal bore (230). The body (300) includes an internal threaded region (330), within the internal bore (230), for fastening the bracket (120) to the aircraft structure (20).

17 Claims, 6 Drawing Sheets

AIRCRAFT STRUCTURE AND A FASTENER FOR USE THEREWITH

RELATED APPLICATIONS

The present application is based on, and claims priority from, British Application Number 0526084.9, filed Dec. 21, 2005, the disclosure of which is hereby incorporated by reference herein in its entirety.

FIELD OF THE INVENTION

The present invention relates to an improved aircraft structure and also to an improved fastener for attachment of stores to an aircraft structure. More particularly, although not exclusively, the present invention relates to an improved fastener for fastening to an aircraft structure a bracket for carrying stores.

BACKGROUND ART

It is well known to provide, on aircraft structure, brackets (for example pylons) for the attachment of engines, ordinance, drop tanks or other stores. Some stores, for example ordinance and drop tanks, are releasably attached to the bracket.

There is increasing demand for aircraft able to perform a range of different roles. Different roles or missions often require different stores and, in some cases, no stores will be carried. For example, an aircraft may be required to carry air-to-air refueling pods for one mission but not for another. A bracket provided for the air-to-air refueling pod may be redundant when the aircraft is performing other duties.

DISCLOSURE OF THE INVENTION

According to a first embodiment, the present invention provides an aircraft panel fastener for securing a skin panel to an underlying internal structural member, the fastener comprising: a head arranged to engage a skin panel; and an elongate body arranged to extend through a skin panel for engagement with an underlying structural member; wherein the fastener further comprises: an internal bore extending from the head into a portion of the body, the bore being provided with an internally threaded region adapted to receive a fastener for fastening to the aircraft structure external stores. For example the bore may receive a fastener for fastening a bracket for carrying stores.

Accordingly, a fastener according to embodiments of the invention may provide a single fastener for the dual function of providing a hard point for carrying external stores and securing a skin panel to the underlying structure. For example, when external stores are required the fastener may perform both functions and when external stores are not required it will still function as a conventional skin panel fastener. The fastener may help protect the skin from damage, for example damage caused by the repeated installation and removal of external stores. A fastener according to embodiments of the invention may prevent the skin from springing away from the underlying structural member and negate the need for any additional bolting to protect the skin, thereby helping to reduce structural weight.

The fastener may be arranged such that the internal bore does not extend completely through the length of the body. For example the internal bore may be a blind bore. This arrangement may be advantageous since the tail of the bolt is solid. When the fastener is attached to an aircraft wing the tail may extend into the fuel tank. A solid tail portion may, for example, help to prevent sparks occurring in the event of a lightening strike.

According to another aspect, the invention provides a fastener assembly comprising: an aircraft panel fastener according to the first embodiment; and a fastener for fastening to the aircraft structure a bracket for carrying stores, said fastener comprising an externally threaded portion adapted to engage the internally threaded region of the aircraft panel fastener such that the fasteners may be removably connected.

In some embodiments the at least the internally threaded region of the aircraft panel fastener is formed of a tougher material which is tougher than at least the externally threaded portion of the fastener for fastening to the aircraft structure a bracket for carrying stores. In the event of damage, for example thread damage, this arrangement may ensure that only the fastener for fastening to the aircraft structure a bracket for carrying stores would need replacing and that the aircraft panel fastener can remain in the aircraft.

From another aspect the invention provides an aircraft structure comprising: a skin panel; an internal structural member; and an aircraft panel fastener according to the first embodiment, securing the skin panel to the internal structure.

The aircraft panel fastener may be directly or indirectly fastened to a structural element of the aircraft, for example a wing rib or spar. For example the internal structure may comprise an internal bracket attached to a structural element and specifically adapted for receiving the fastener.

The head of the fastener may be substantially flush with the skin panel. For example, the head may be countersunk into the skin panel. This arrangement may help to ensure that the skin retains a smooth aerodynamic profile when the fastener is not being used for securing external stores.

The skin panel may comprise a carbon fibre composite panel. The internal structural member may be a metallic internal structure. Embodiments of the invention may be particularly suitable for use with composite structures. Embodiments of the invention may help to protect to protect holes in the carbon fibre skin panels. For example, embodiments may help to prevent local delamination of composite material due to regular installation and removal of external stores.

From another aspect, the invention provides an aircraft structure comprising: (1) a structural skeleton comprising structural components enclosed within a skin; (2) a fastener, fastened to the skeleton, for fastening to the aircraft structure a bracket for carrying stores, the fastener comprising a body defining an internal bore, the body including an internal threaded region, within the internal bore, for fastening the bracket to the structure, the fastener being wholly within the structure skin.

The invention thus provides a hard point for attachment of an item external to the aircraft structure, whilst allowing the structure to have a clean external surface when the item is not fitted. The bracket is thus removably fastenable.

The fastener may also be arranged to fasten the structure skin to the structure components.

The aircraft structure may be an aircraft wing or fuselage.

The structure may further comprise a bracket external to the structure skin and fastened to the fastener. The bracket may be fastened to the fastener by one or more bolts that engage with the internal threaded region of the bore. It will be understood that the bracket is an element, external to the wing, for attaching underwing stores. The bracket may be, for example, a pylon.

The fastener may comprise a substantially cylindrical body having a first end and a second end. The fastener may be fastened to the skeleton at an external threaded region, at the body's first end. The body may comprise a flange at the body's second end for engaging with an external surface of the skin.

The fastener may be fastened directly to the structural components. The skeleton may include an internal bracket and the fastener may be fastened to the internal bracket, which in turn is fastened to the structural components. The structural components may be a wing rib or a wing spar.

The body of the fastener may include a flat region for locking with a locking collar or plate. The skeleton may include a collar for receiving the fastener, the collar being within the structure skin and including a flange, the skeleton defining a slot for receiving the flange, the slot being arranged to prevent rotation of the collar when the flange is received in the slot.

The aircraft structure may comprise a plurality of the fasteners, wherein the collar receives a first of said fasteners and wherein the aircraft structure further comprises a flange defining said slot and defining a hole through which a second of said fasteners passes.

The aircraft structure may comprise a plurality of the fasteners and at least two of said plurality of fasteners may be locked together with a locking plate. The locking plate may be arcuate, with a fastener passing through a hole at an end of the arc. There may be a fastener at each end of the arc.

In a further aspect, the invention provides an aircraft structure comprising: (1) a structural skeleton comprising structural components enclosed within a skin; (2) a fastener, fastening the skin to the skeleton and for fastening to the structure a bracket for carrying stores, the fastener comprising a body defining an internal bore, the body including means for fastening within the internal bore the bracket to the structure, the fastener being wholly within the skin.

In a further aspect, the invention provides a fastener for fastening to an aircraft structure a bracket for carrying stores, the aircraft structure comprising an internal skeleton and an external skin, the fastener comprising a substantially cylindrical body having a first end and a second end and defining an internal bore, the body comprising: (1) an internal threaded region, within the internal bore, for fastening the bracket to the aircraft structure, and an external threaded region, at the body's first end, for fastening the fastener to the aircraft structure's skeleton; (ii) a flange at the body's second end for engaging with an external surface of the skin; (iii) a flat region for locking with a locking collar or plate; and wherein the body is also arranged to provide a load path between the external skin and the internal skeleton when not fastening a bracket for carrying stores.

It will be appreciated that features of the present invention described above in relation to an aspect of the present invention are equally applicable to other aspects of the invention.

BRIEF DESCRIPTION OF THE DRAWINGS

Certain illustrative embodiments of the invention will now be described in detail, by way of example only, with reference to the accompanying schematic drawings, in which.

DETAILED DESCRIPTION

Figure 1A:
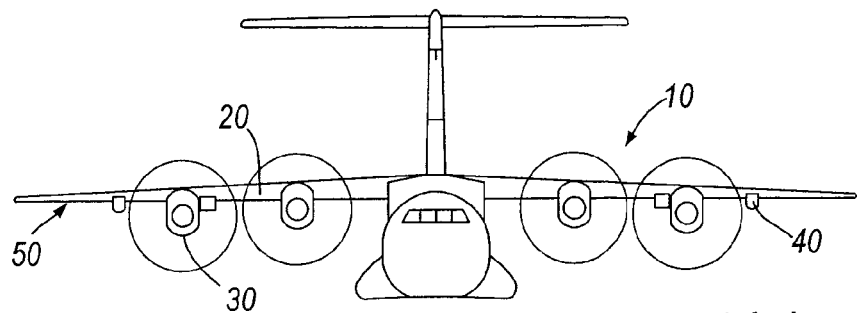
FIG. 1 is an aircraft including wings according to the an embodiment of the invention, shown in (a) front elevation, (b) side elevation, (c) plan view.
Figure 1B:
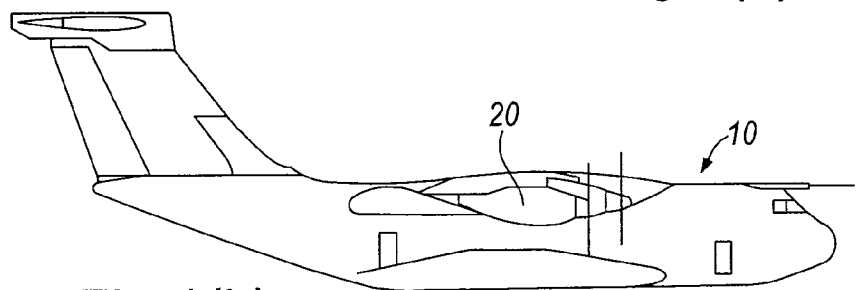
Figure 1C:
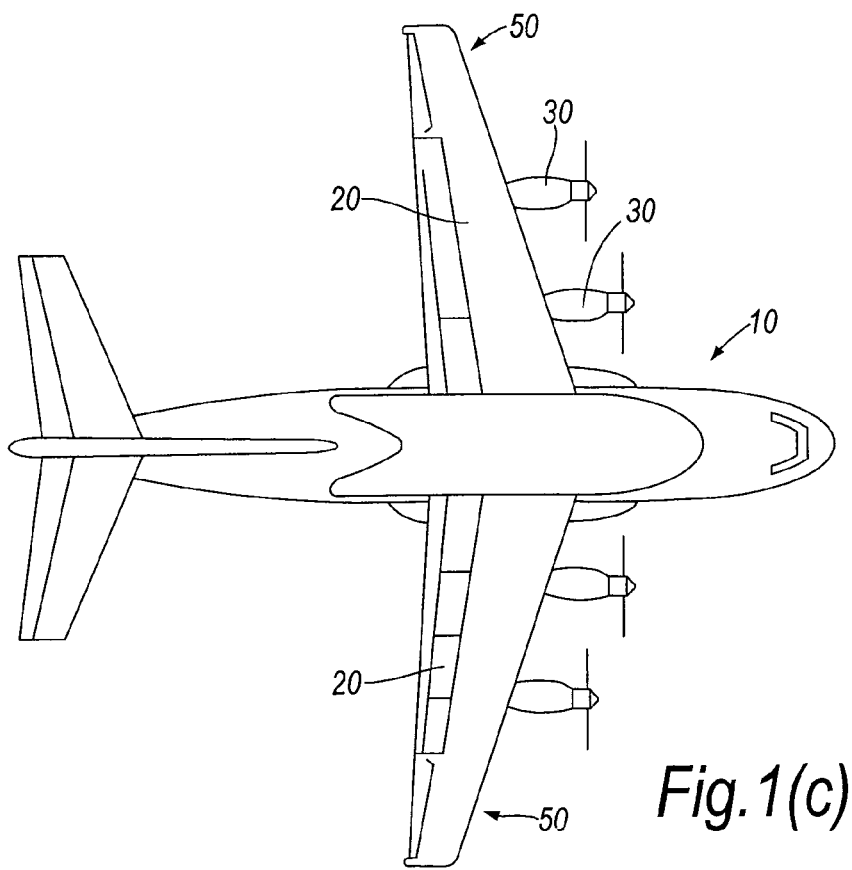

An aircraft 10 has wings 20 that are examples of aircraft structure according to the invention (FIG. 1). The wings 20 are arranged to carry a variety of items. Engines 30 are permanently attached to the wings 20 via brackets in the form of pylons. Further pylons 40 are provided for attachment of other underwing stores, in a manner well known in the art. The wing 20 according to the invention includes in this example a further hard point 50 for attaching underwing stores. When hard point 50 is not in use, as in FIG. 1, it does extend beyond the surface of wing 20, so that wing 20 has a substantially smooth outer surface in this area.

Figure 2:
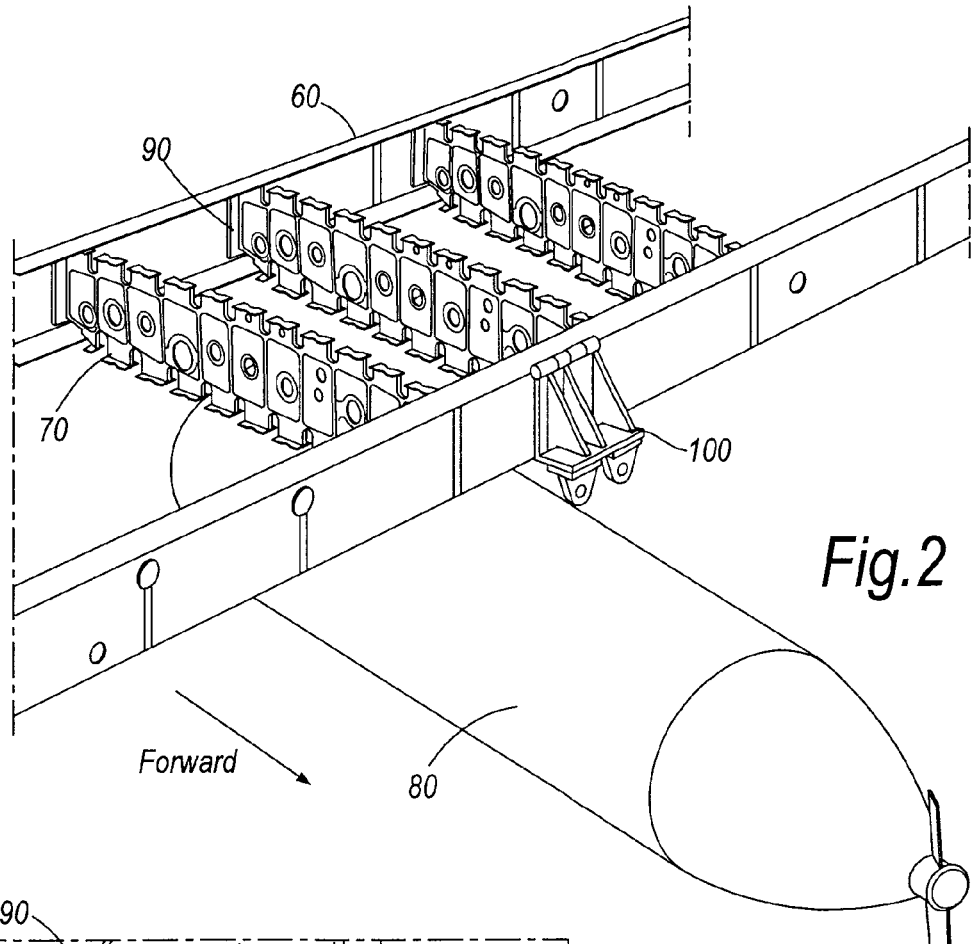
FIG. 2 shows skeletal structure from the wing of the aircraft of FIG. 1, together with an air-to-air refueling pod for fastening to the skeletal structure.

Hard point 50 is used for attachment of underwing stores such as air-to-air refueling pod 80 (FIG. 2) which is used to refuel other aircraft in mid-air. When aircraft 10 is on a mission that does not include air-to-air refueling, pod 80 is not required and so is not installed, leaving hard point 50 smooth for improved aerodynamic performance. When it is attached to aircraft 10, pod 80 is attached to the skeletal structure of wing 20, in particular to ribs 70 and spars 60, to which it is attached by wingbox interface brackets 90 and 100, respectively.

Figure 3:
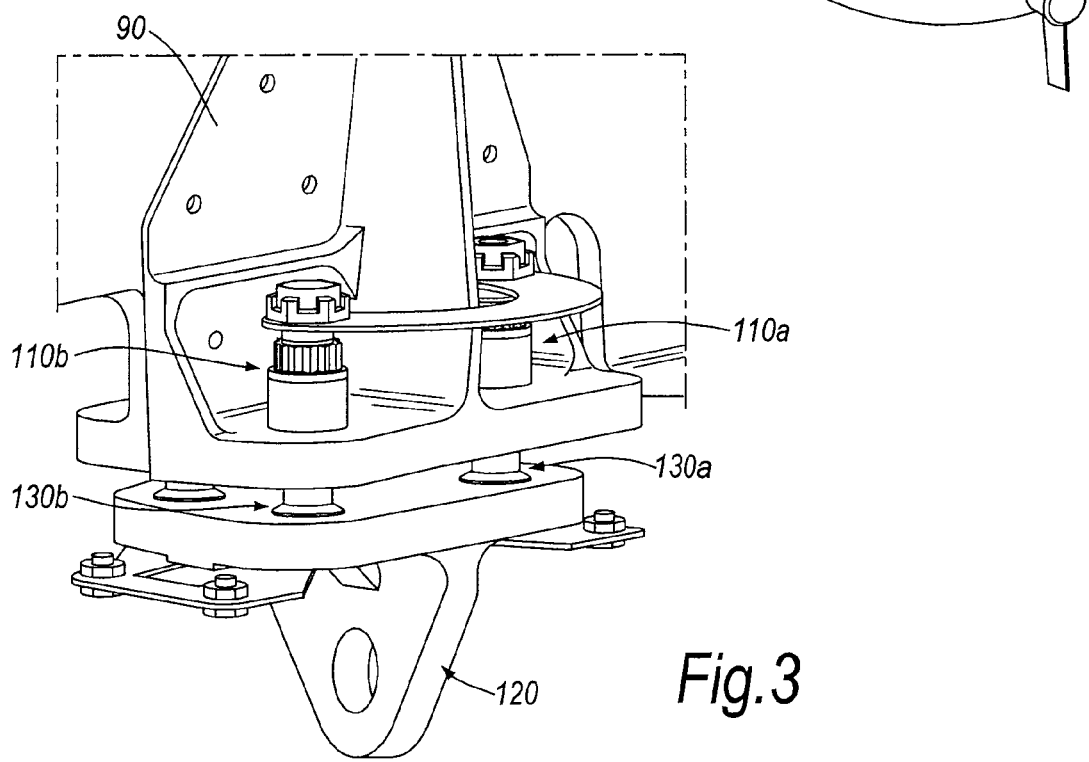
FIG. 3 shows a detail of two fasteners on a rib forming part of the skeletal structure of FIG. 2.

The attachment arrangement at bracket 90 is shown in more detail in FIG. 3 (the arrangement at bracket 100 is similar). Pod 80 is attached to pylon bracket 120, which sits outside the skin of wing 20. Pylon 120 is attached to bracket 90 by external bolts 130a,b and hollow bolts 110a,b. External bolts 130a,b are bolts of conventional design. Hollow bolts 110a,b have a threaded internal bore, into which external bolts 130a,b are screwed. Thus external bolts 130a,b extend through pylon 120 and the wing skin (not shown in FIG. 3) and are secured inside hollow bolts 110a,b, which in turn extend through and are bolted to bracket 90. Hollow bolts 110a,b and bracket 90 are wholly within the skin of wing 20; pylon 120 is wholly outside the skin; and external bolts 130a,b pass through the skin. When pod 80 is not in use, pylon 120 and external bolts 130a,b are not present and none of the attachment equipment extends beyond the surface of wing 20. There are holes in the wing skin, which in use receive external bolts 130a,b, but those are blanked off when the hard point is not in use, so this part of wing 20 presents a substantially smooth aerodynamic surface. That bolt-in-bolt fastening arrangement allows repeated on/off fittings of items external to wing 20. Hollow bolts 110a,b protect the wing skin from damage during repeated installation and removal of external bolts 130a,b.

Figure 4:
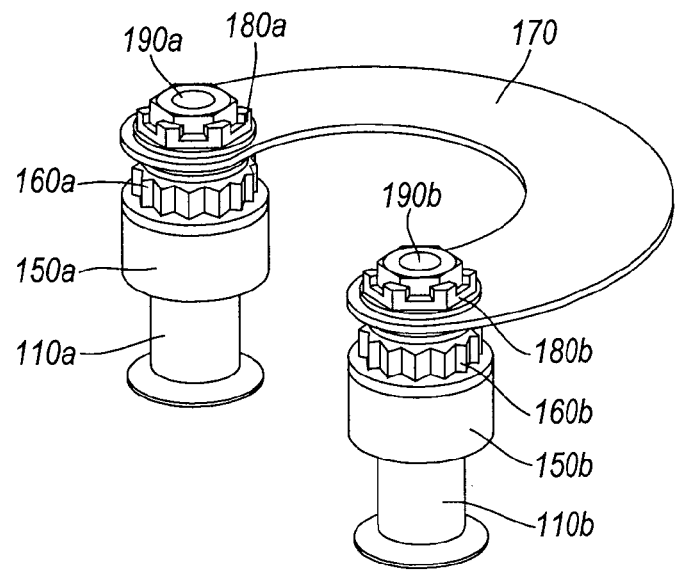
FIG. 4 shows in more detail the two fasteners of FIG. 3.
Figure 5:
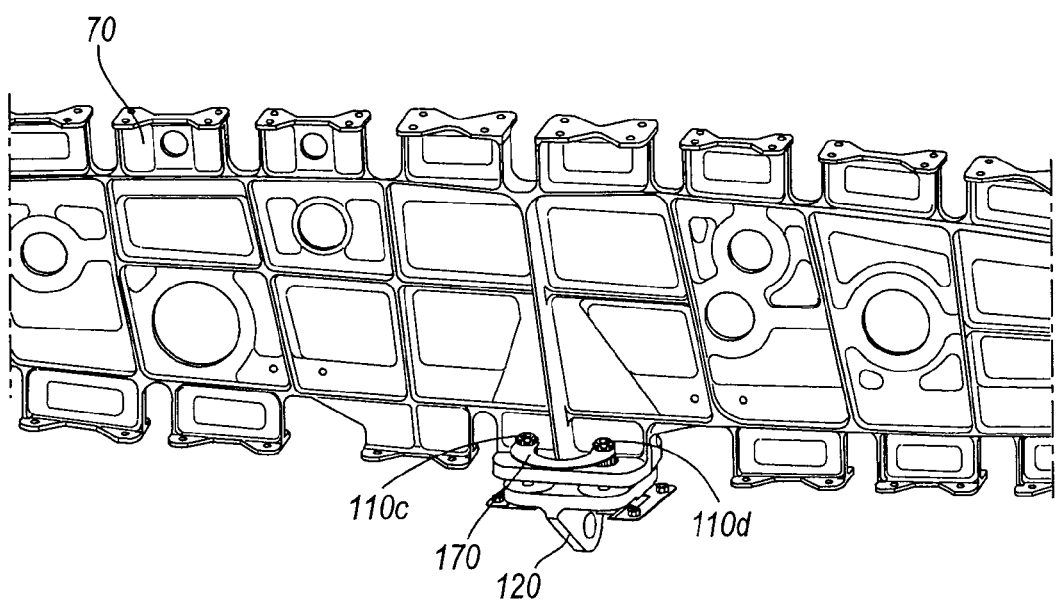
FIG. 5 shows another fastening arrangement from a wing according to an embodiment of the invention.

The arrangement by which bracket 90 is attached to rib 70 is shown in more detail in FIGS. 4 and 5. Hollow bolts 110a,b extend through rib 70 (not shown in FIG. 4) and collar 150a,b, which bears against rib 70. Hollow bolts 110a,b are locked in place against collars 150a,b by bolt-securing nuts 160a,b. In order to prevent rotation of hollow bolts 110a,b when external bracket attachment bolt 130a,b is torqued to a required preload, a locking plate 170 is installed to lock hollow bolts 110a and 110b to each other. Plate 170 is in turn held in place on hollow bolts 110 by plate-securing nuts 190a,b.

In another example arrangement (FIG. 5), hollow bolts 110c,d are attached directly to rib 70, without use of a bracket 90.

Figure 6:
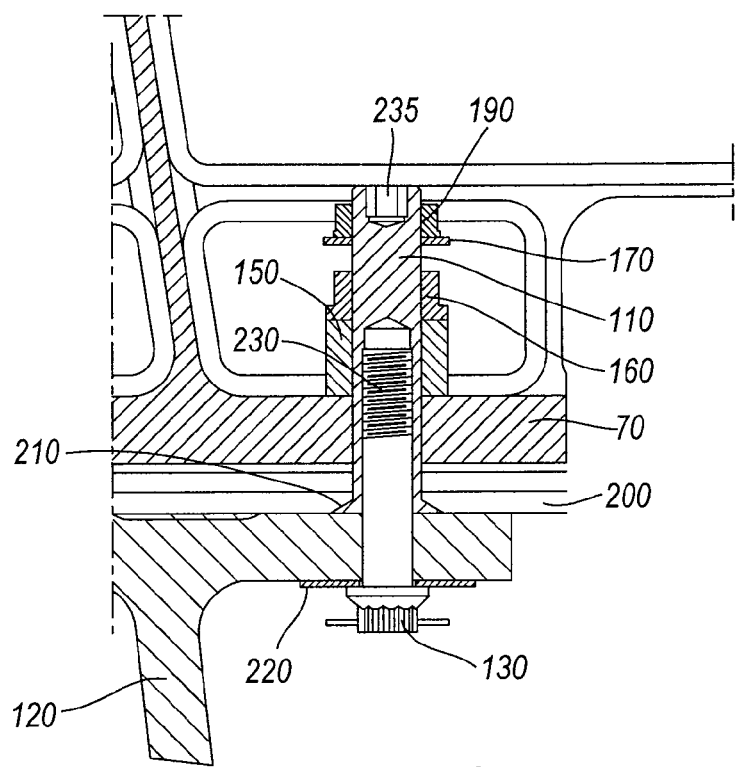
FIG. 6 is a cross-sectional view of a fastener of FIG. 5 fastening a pylon to a rib of a wing according to the invention.

The attachment arrangements are shown in more detail in FIG. 6; pylon 120 is also shown in situ in FIG. 6. Hollow bolt 110 includes at its head flange 210, which is seated in a countersunk region of a hole passing through wing skin 200. Hollow bolt 110 passes through the skin 200, rib 70 and also collar 150, to which it is fastened by bolt-securing nut 160, as described above. Locking plate 170 co-operates with a flattened region at the distal end of hollow bolt 110, to prevent its rotation, and is held in place by plate-securing nut 190, as also described above. Hexagonal socket 235 is provided to allow tightening of nuts 160 and 190.

Countersunk head 210 lies flush with skin 200. Pylon 120 is fastened to skin 200 by external bolt 130, which bears on washer 220. External bolt 130 passes through a hole in pylon 120 and is screwed at its distal end into a threaded region of internal bore 230 within hollow bolt 110.

Wing 20 will usually be used to store fuel for the aircraft 10. Because external bolt 130 is received within the closed bore 230 of hollow bolt 110, there is no path for fuel to leak from the tank.

Figure 7:
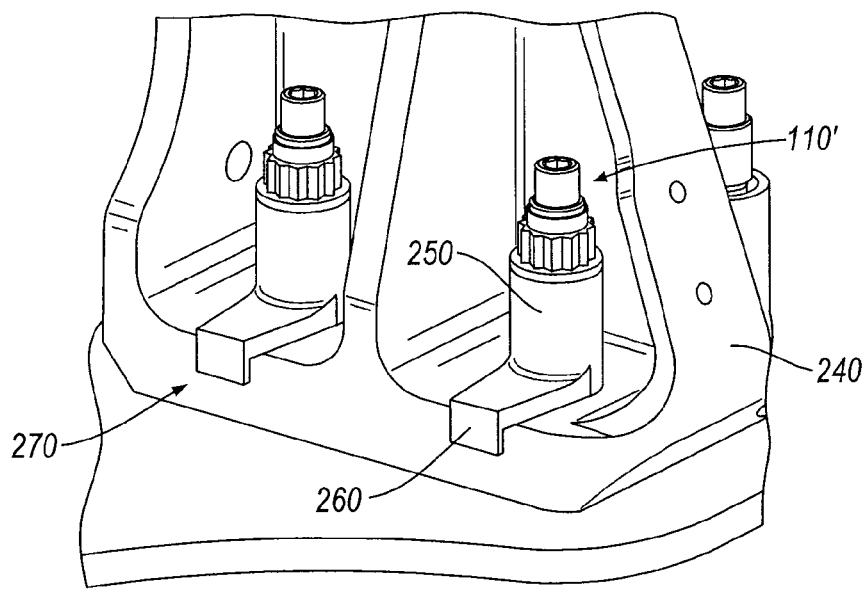
FIG. 7 shows another fastening arrangement from a wing according to an embodiment of the invention.
Figure 8:
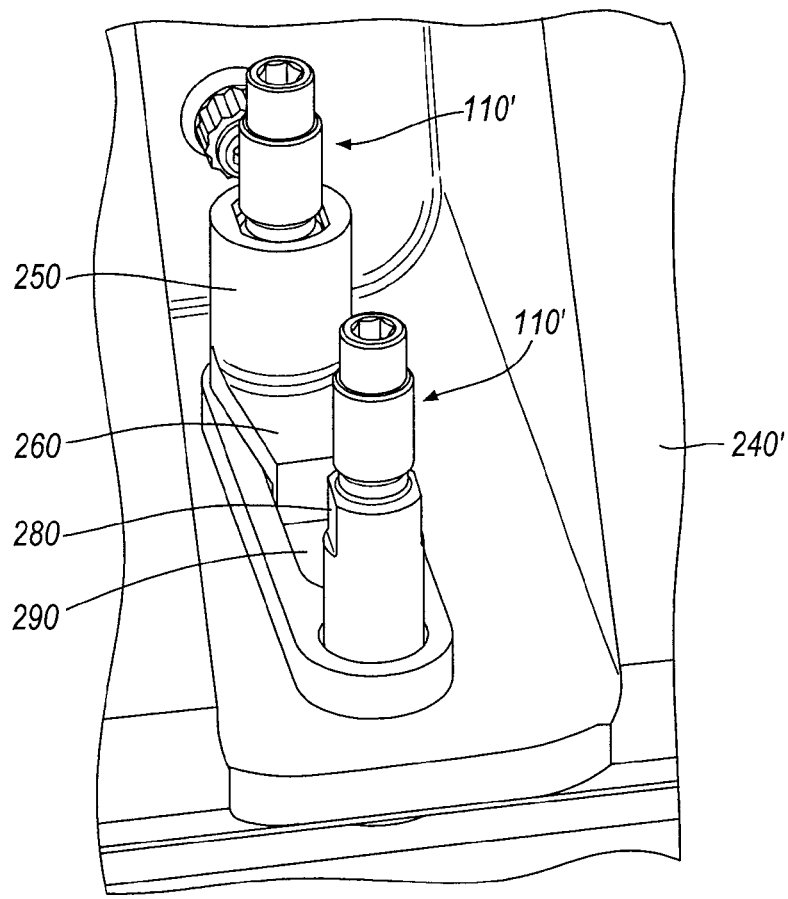
FIG. 8 shows another fastening arrangement from a wing according to an embodiment of the invention.

In another embodiment of the invention (FIG. 7), hollow bolt 110' passes through flanged collar 250 rather than collar 150. Flanged collar 250 includes internal flat regions (not shown) which co-operate with flat regions on the exterior of hollow bolt 110' to prevent relative rotation of flanged collar 250 and hollow bolt 110'. Flanged collar 250 includes at its base flange 260, which is seated in slot 270 in bracket 240. Co-operation between flange 260 and slot 270 prevents rotation of flanged collar 250 and hence of hollow bolt 110'.

Where a thinner bracket 240' is used (FIG. 8), flange 260 is seated in a slot in packer 290, which acts to prevent rotation in a similar way to slot 270. A second hollow bolt 110' passes through packer 290, which prevents rotation of packer 290.

Figure 9A:
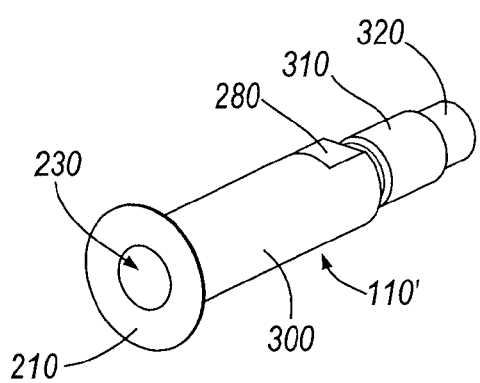
FIG. 9 is two isometric views of an element of one of the fasteners of FIGS. 7 and 8.
Figure 9B:
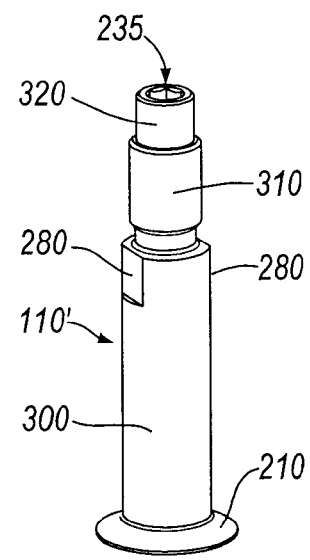
Figure 10A:
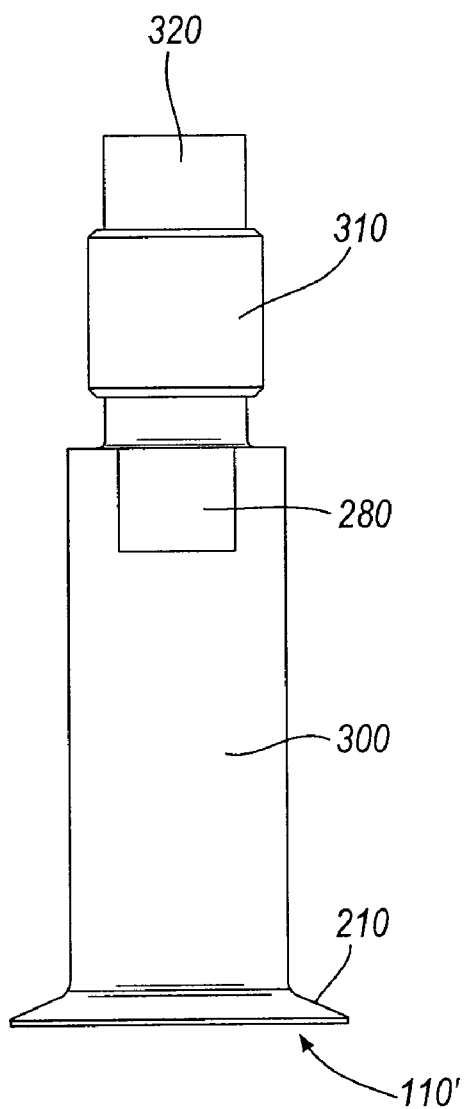
FIG. 10 shows the fastener element of FIG. 9 in (a) side view and (b) cross-section.

Hollow bolt 110' is shown in more detail in FIGS. 9 and 10. It comprises a cylindrical body 300, which defines interior bore 230. Body 300 has at a first end flange 210, which is seated in use in a countersunk hole in the wing skin 200, as described above. About two-thirds of the way along its length from flange 210, two flats 280 are provided, which co-operate with flanged collar 250 to prevent rotation, as described above. Beyond flats 280 there is a head region 310, which carries an external thread (not shown) to receive collar-locking nut 160. At the distal end of hollow bolt 110' there is a smooth region 320 around hexagonal socket 235.

Figure 10B:
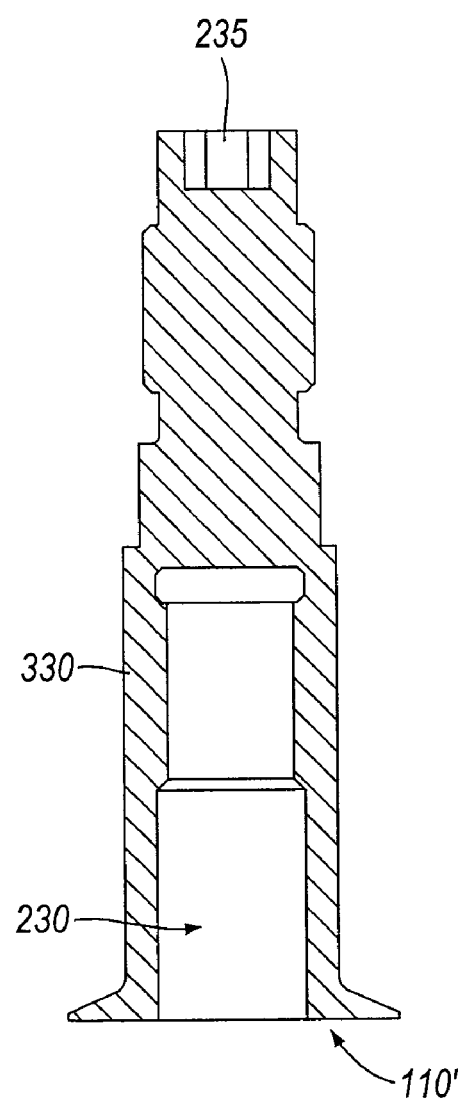

Internally (FIG. 10(b)), bore 230 extends for about half the length of hollow bolt 110'. An internal thread 330 is provided along about half of bore 330 (the deeper half, furthest from flange 210). In use, external bolt 130 is received in bore 230 and fastened at thread 330.

Hollow bolt 110 of the first embodiment described above is identical to hollow bolt 110' of the second embodiment, save that it does not have flats 280 but instead has flats in its distal end region 320, which co-operate with plate 170, and an external thread at head 320's distal end (corresponding to regions 320), which receives plate-locking nut 190.

Whilst the present invention has been described and illustrated with reference to particular embodiments, it will be appreciated by those of ordinary skill in the art that the invention lends itself to many different variations not specifically illustrated herein. Some examples of such variations and alternatives have been described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A fastener assembly, comprising:
   an aircraft panel fastener for securing an aircraft skin panel to an underlying internal structural member of an aircraft structure, the aircraft panel fastener comprising:
      a head arranged to engage a skin panel;
      an elongate body arranged to extend through the skin panel for engagement with the underlying structural member; and
      an internal bore extending from the head into a portion of the body, the bore being provided with an internally threaded region; and
   a second fastener for fastening to the aircraft structure a bracket for carrying stores, said second fastener comprising an externally threaded portion adapted to engage the internally threaded region of the aircraft panel fastener to removably connect the two fasteners;
   wherein the internally threaded region of the aircraft panel fastener is formed of a material which is tougher than that of the externally threaded portion of the second fastener.

2. The fastener assembly as claimed in claim 1, wherein the internal bore comprises a blind bore.

3. An aircraft structure, comprising:
   a skin panel;
   an internal structural member; and
   an aircraft panel fastener securing the skin panel to the internal structural member, the aircraft panel fastener comprising:
      a head arranged to engage the skin panel;
      an elongate body arranged to extend through the skin panel for engagement with the internal structural member; and
      an internal bore extending from the head into a portion of the body, the bore being provided with an internally threaded region adapted to receive another fastener for fastening external stores to the aircraft structure;
   wherein the head of the fastener is substantially flush with an outer surface of the skin panel.

4. The aircraft structure of claim 3, wherein the skin panel comprises a carbon fibre composite panel.

5. The aircraft structure of claim 4, wherein the internal structural member comprises a metallic internal structure.

6. An aircraft structure, comprising:
   a structural skeleton comprising structural components enclosed within a skin;
   a bracket external to the structure skin and for carrying stores; and
   a fastener, fastened to the skeleton, for fastening to the aircraft structure said bracket, the fastener comprising a body defining an internal bore, the body including an internal threaded region, within the internal bore, for fastening the bracket to the structure, the fastener being wholly within the structure skin; the fastener further comprising a head arranged to engage the structure skin, wherein the head of the fastener is substantially flush with an outer surface of the structure skin;

wherein said bracket is fastened to the fastener by a second fastener which comprises an externally threaded portion directly and removably engaged with the internally threaded region of the fastener to removably fasten the bracket to the aircraft structure.

7. A structure as claimed in claim 6, wherein the fastener is also arranged to fasten the structure skin to the skeleton.

8. A structure as claimed in claim 6, wherein the aircraft structure is an aircraft wing or fuselage.

9. A structure as claimed in claim 6, wherein the bracket is a pylon.

10. A structure as claimed in claim 6, wherein the fastener is fastened to a wing rib or a wing spar of the skeleton.

11. A structure as claimed in claim 6, wherein the skeleton includes an internal bracket and the fastener is fastened to the skeleton via the internal bracket.

12. A structure as claimed in claim 6, further comprising a collar for receiving the fastener, the collar being within the structure skin and including a flange, the skeleton defining a slot for receiving the flange, the slot being arranged to prevent rotation of the collar when the flange is received in the slot.

13. A structure as claimed in claim 12, comprising a plurality of said fasteners, wherein the collar receives a first of said fasteners and wherein the structure further comprises a flange defining said slot and defining a hole through which a second of said fasteners passes.

14. A structure as claimed in claim 6, comprising a plurality of said fasteners.

15. A structure as claimed in claim 14, in which at least two of said plurality of fasteners are locked together with a locking plate.

16. An aircraft structure, comprising:
 a skin panel;
 an internal structural member;
 an aircraft panel fastener securing the skin panel to the internal structural member;
 a bracket for carrying stores on the outside of the skin; and
 a second fastener;
 wherein the aircraft panel fastener comprising:
  a head arranged to engage the skin panel, wherein the head of the fastener is substantially flush with an outer surface of the skin panel;
  an elongate body arranged to extend through the skin panel for engagement with the internal structural member; and
  an internal bore extending from the head into a portion of the body, the bore being provided with an internally threaded region; and
 wherein the second fastener comprises an externally threaded portion directly and removably engaged with the internally threaded region of the aircraft panel fastener to removably fasten the bracket to the aircraft structure.

17. The aircraft structure of claim 16, wherein the internally threaded region of the aircraft panel fastener is formed of a material which is tougher than that of the externally threaded portion of the second fastener.

* * * * *